United States Patent
Huang

(10) Patent No.: US 6,704,144 B2
(45) Date of Patent: Mar. 9, 2004

(54) COLOR SEPARATION PRISM ASSEMBLY COMPENSATED FOR CONTRAST ENHANCEMENT AND IMPLEMENTED AS REFLECTIVE IMAGER

(76) Inventor: Junejei Huang, No. 186, Ruey Kuang Road, Neihu, Taipei (TW)

(*) Notice: Subject to any disclaimer, the term of this patent is extended or adjusted under 35 U.S.C. 154(b) by 0 days.

(21) Appl. No.: 10/159,465

(22) Filed: May 30, 2002

(65) Prior Publication Data

US 2002/0181117 A1 Dec. 5, 2002

Related U.S. Application Data

(60) Provisional application No. 60/294,332, filed on May 30, 2001.

(51) Int. Cl.[7] .................. G02B 27/14; G02B 27/12; G02B 27/10; G02B 5/04
(52) U.S. Cl. .................. 359/634; 359/640; 359/618; 359/629; 359/636; 359/834
(58) Field of Search .................. 359/634, 640, 359/618, 629, 636, 638, 639, 833, 834, 836, 487; 353/31; 358/515

(56) References Cited

U.S. PATENT DOCUMENTS 4,825,246 A * 4/1989 Fukuchi et al. ............. 358/515
5,223,983 A * 6/1993 Oono et al. ............. 242/342

* cited by examiner

Primary Examiner—Georgia Epps
Assistant Examiner—Jack Dinh
(74) Attorney, Agent, or Firm—Bo-In Lin

(57) ABSTRACT

This invention discloses a color separation prism assembly. The prism assembly includes three triangular-shaped prisms having identical shape and size. Each of the three triangular-shaped prisms has two triangular surfaces as interfacing surfaces bonded to two identical triangular surfaces of two other prisms. At least two triangular surfaces of the three triangular-shaped prisms are coated with color separation filtering films for reflecting a first color light and transmitting a second color light therethrough. At least two triangular surfaces of the three triangular-shaped prisms are coated with a total reflective coating constituting at least two total internal reflective (TIR) surfaces for reflecting a light projected thereon. Each of the TIR surfaces further comprising a phase-shift compensating coating coated thereon. The color separation prism assembly further includes three liquid crystal on silicon (LCOS) modulating means for modulating a separated color beam color-separated and projected thereon through the color separation prism assembly. The three triangular-shaped prisms with identical shape and size are further assembled as a combined prism.

16 Claims, 5 Drawing Sheets

COLOR SEPARATION PRISM ASSEMBLY COMPENSATED FOR CONTRAST ENHANCEMENT AND IMPLEMENTED AS REFLECTIVE IMAGER

This Application claims a Priority Date of May 30, 2001, benefited from a previously filed Provisional Application No. 60/294,332 filed on May 30, 2001 by the same Applicant of this Patent Application.

FIELD OF THE INVENTION

The present invention relates generally to the image display systems that utilize color separation prisms. More particularly, this invention relates to an improved method and configuration for assembling a color separation prism assembly compensated for contrast enhancement and implemented as reflective imager.

BACKGROUND OF THE INVENTION

A technical difficulty of compound angle depolarization is still confronted by those of ordinary skill in the art in designing and assembling reflective imager type projection display systems implemented with a polarization beam splitter (PBS). Color separation prisms are placed between quarter wave plate (QWP) and imager cause undesirable phase changes at the tilted dichroic and total internal reflection (TIR) surfaces. System performance is degraded because of the poor contrast. A quarter wave plate (QWP) placed between polarization beam splitter (PBS) and reflective imager will correct compound angle depolarization. However, the process required to glue the QWP adds to the processing complexities that causes difficulties in mass production. Thin films with optical characteristics to control phase difference can be coated on the total internal reflection and dichroic reflection surfaces to mitigate the effects caused by undesirable phase changes. However, existing color separation prism assemblies, as will described below, are faced with the difficulties that the assemblies become quite massive and occupy a large volume in order to provide color separation for a third color channel.

The limitation can be understood by examining a prior art patent issued to Bryars et. al. U.S. Pat. No. 6,144,498, entitled "Color Separation Prism Assembly and Method for Making Same". This patent discloses a color separation device assembled from three prisms in an arrangement that provides for air equivalent thickness adjustment for each color. The air equivalent thickness adjustment provides for the correction of deviations in any of the three prisms, as well as providing a method to correct for the chromatic aberration arising from other optical elements in the information display system. The color separation device is disclosed to improve the image quality and provides opportunities to lower the display system cost by using low tolerance components and/or plastic optical components normally having a high chromatic aberration.

As discussed in Bryars et al. the combination of dichroic filters and prisms is commonly used in color imaging and display systems as a way to separate colors or combine the primary colors into the final image. A compact optical element that accomplishes this purpose is known as a Philips prism. The Philips prism assembly is commonly known, and various uses thereof are described in U.S. Pat. Nos. 2,392,978, 3,659,918, 4,009,941, 4,084,180, and 4,913,528, the disclosures of of these patents and that by Bryars et al. in U.S. Pat. No. 6,144,498 are incorporated herein by reference.

Referring to FIG. 1A for a perspective view of a conventional Philips prism assembly 10. The prism assembly 10 includes a first triangular prism 12 and a second triangular prism 14, with a third prism 16 having at least four sides. The triangular prisms 12 and 14 are positioned with respect to each other to provide an air gap 18 at their interface. The second triangular prism 14 and third prism 16 are optically cemented at an interface 20 of these prisms. As indicated in FIG. 1, prism 12 is configured to separate red light (R), prism 14 is configured to separate blue light (B), and prism 16 is configured to receive green light (G). The light ray paths through prism assembly 10 are shown in FIG. 1. An incident ray i passes into prism 12, with a portion thereof (e.g. red light) internally reflected and emerging from prism 12 as r1. The remaining portion of the incident light passes into prism 14, with a portion thereof (e.g., blue light) internally reflected and emerging from prism 14 as r2. The remaining portion of the incident ray (e.g., green light) emerges from prism 16 as r3. A color separation into red, green and blue (RGB) is therefore achieved with this Philip prism.

For a purpose to correct for the chromatic aberration of the optical system components, U.S. Pat. No. 6,144,498 discloses a color separation prism assembly as that shown in FIG. 1B. FIG. 1B is a ray diagram for a prism assembly 30 where prism 14 is assembled with an offset with respect to prisms 12 and 16 from the nominal position. The dashed arrowhead line in prism 14 represents the physical path for a prism assembly having no deviation from the nominal design. The dashed line in prism 12 represents the nominal position for the now longer side of prism 12 forming the exit facet adjacent prism 14. The solid segment lines in prism 30 represent the actual physical path caused by the deviations in prisms 12 and 14 utilized to assemble prism 30 in the corrective offset position. The prisms are offset in one dimension whereby the parallel relationship between connected facets is maintained and the path lengths are equalized such that: (ABCD)new=(ABA'B'C'D')new. The prism 16 is displaced a distance away from the common edge with prism 14 by translating its common facet parallel to the interface. The amount of displacement for prism 16 is calculated such that: (ABCD)new=(ABA'B'A"B") new. The prisms as disclosed above all have large volume. In the Philip prism assemblies described above, compensating foils on the reflection surface are used and the third prism is cut into two and one tilted interface is added to properly control the differential phase shift incurred in optical transmission. The assemblies are made with prisms of different shapes thus requires more complex assembling processes that lead to higher production cost and lower product yield and poor reliability.

Referring to FIGS. 1C and 1D for alternate prior art color separation prism assemblies disclosed by Greenberg and Bryars that comprises three prisms of distinctly shapes. The third prism is modified such that the third prism is a mirror image of the second prism. A total internal reflection (TIR) surface for the third channel is introduced. This modified prism assembly has an advantage that the prism assembly is more compact than the regular Philip prism assembly described above. However, the modified assembly creates another problem of introducing aberrations due to addition of extra components. Corrections of aberrations through differential phase shifts through transmission cannot be conveniently achieved. Furthermore, as the modified prism assembly still requires more than one types of prisms, the increase of manufacturing costs due to processes in handling different types of prisms is still not resolved.

Therefore, a need still exists in the art to provide a new and improved color separation prism assembly to overcome the above difficulties and limitations. A simplified, more compact and more economical color separation prism assembly would be desirable to further advance the state of the art of prism assembly for color separation applications.

SUMMARY OF THE PRESENT INVENTION

It is therefore an object of the present invention to provide a color separation prism assembly that is more compact in size and weight and can be more conveniently manufactured and assembled such that the difficulties and limitations encountered by the prior art can be resolved.

Specifically, it is an object of the present invention to provide a new and improved prism assembly configured with three triangular prisms of identical size and shape. These three triangular prisms are further assembled into a combined prism with internal interfacing surfaces coated with dichroic filtering film for separating light into color beams. The combined prism assembled with three prisms of same shape and size is more compact and can be more conveniently manufactured and assembled by simplified processes with reduced production cost.

Another object of this invention is provide new and improved color separation prism assembly with total internal reflective (TIR) surfaces coated with phase-shift compensation coatings on only two of these TIR surfaces to reduce the work and costs required for phase-shift compensation.

Another object of this invention is provide new and improved color separation prism assembly with three triangular prisms of same shape and size to assemble into a combined prism. The combined prism thus provides a better heat dissipation configuration cooled by a single fan for dissipating the heat generated from optical energy stored in the combined prism.

Briefly, in a preferred embodiment, the present invention includes color separation prism assembly. The prism assembly includes three triangular-shaped prisms having identical shape and size. Each of the three triangular-shaped prisms has two triangular surfaces as interfacing surfaces bonded to two identical triangular surfaces of two other prisms. At least two triangular surfaces of the three triangular-shaped prisms are coated with color separation filtering films for reflecting a first color light and transmitting a second color light therethrough. At least two triangular surfaces of the three triangular-shaped prisms are coated with a total reflective coating constituting at least two total internal reflective (TIR) surfaces for reflecting a light projected thereon. Each of the TIR surfaces further comprising a phase-shift compensating coating coated thereon. The color separation prism assembly further includes three liquid crystal on silicon (LCOS) modulating means for modulating a separated color beam color-separated and projected thereon through the color separation prism assembly. The three triangular-shaped prisms with identical shape and size are further assembled as a combined prism.

These and other objects and advantages of the present invention will no doubt become obvious to those of ordinary skill in the art after having read the following detailed description of the preferred embodiment which is illustrated in the various drawing figures.

DETAILED DESCRIPTION OF THE INVENTION

Embodiments for illustrating how to make and carry out the present invention are described below with reference to drawings that show the details of the structure and operation of embodiments.

Figure 1A:
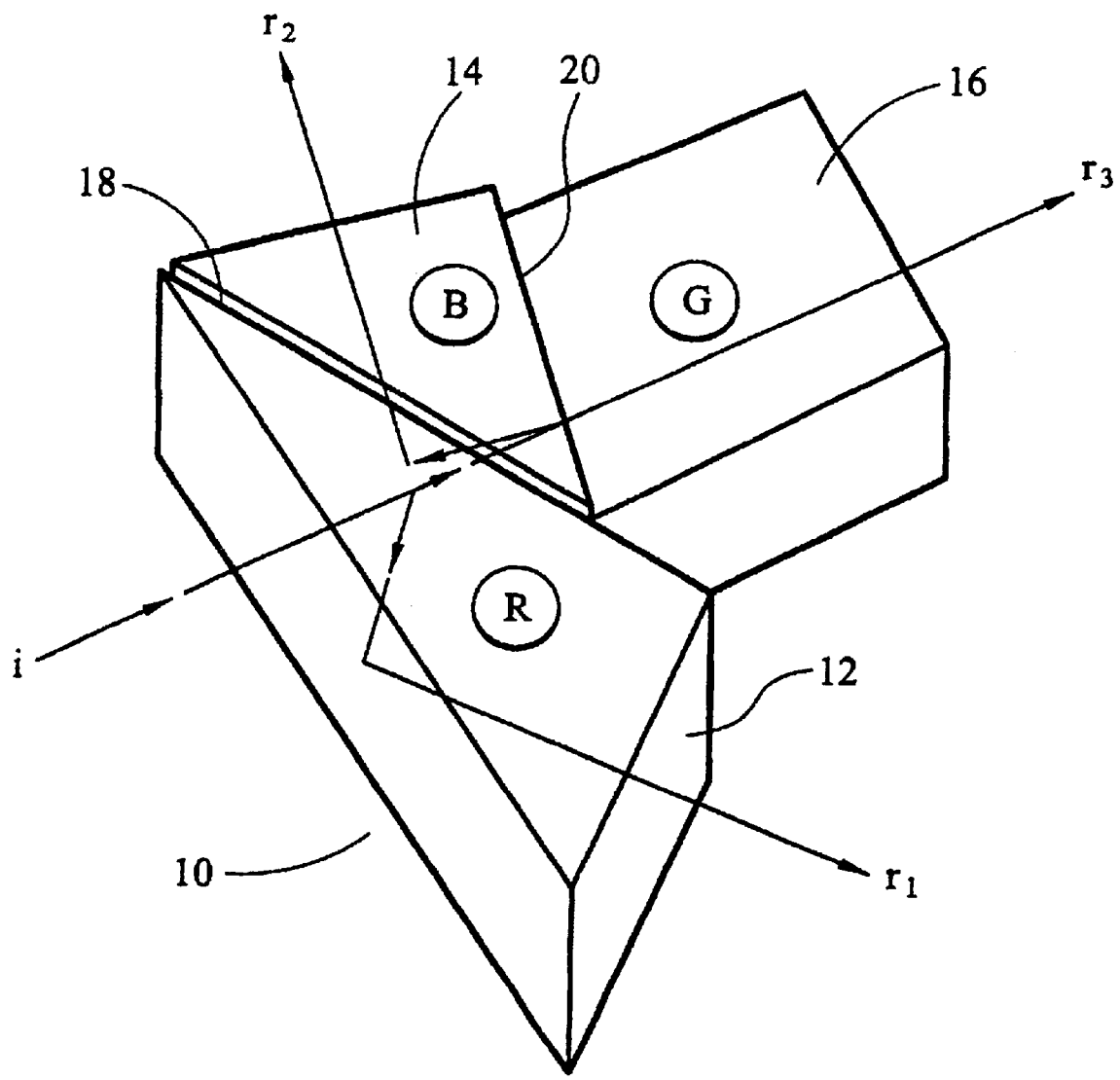
FIG. 1A is a perspective view of a conventional Philips prism assembly.
Figure 1B:
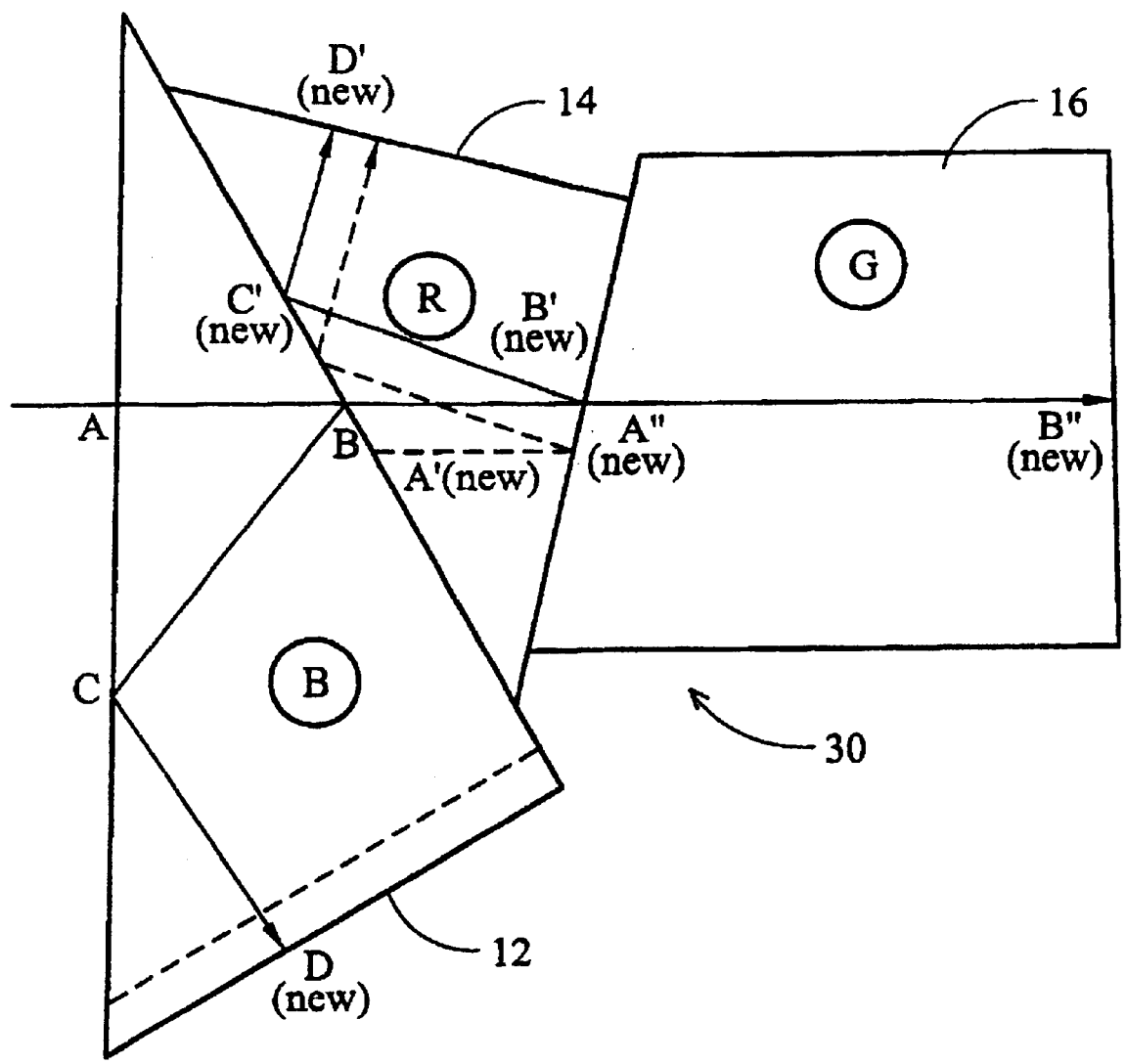
FIG. 1B is a ray diagram of a three-prism assembly for showing the optical paths disclosed in a prior art patent.
Figure 1D:
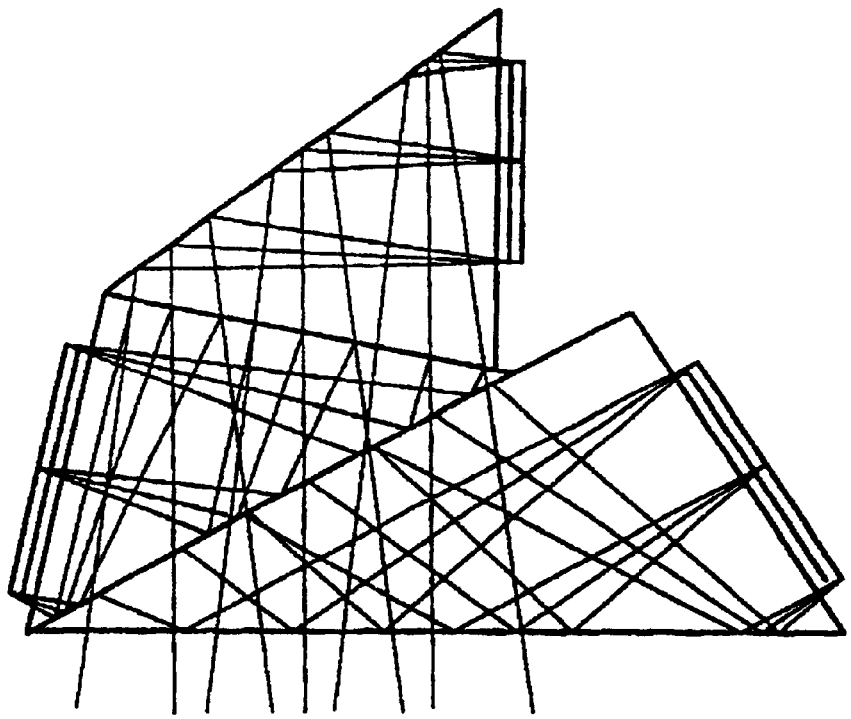
FIGS. 1C and 1D is a schematic diagram of another color separation prism assembly shown by a prior art disclosure.
Figure 1C:
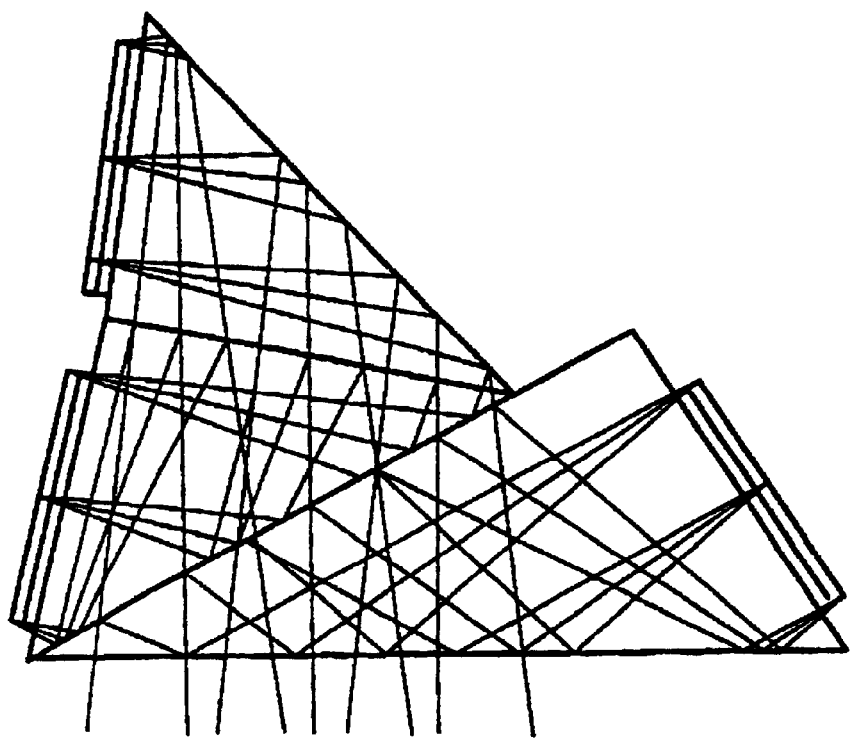
Figure 2:
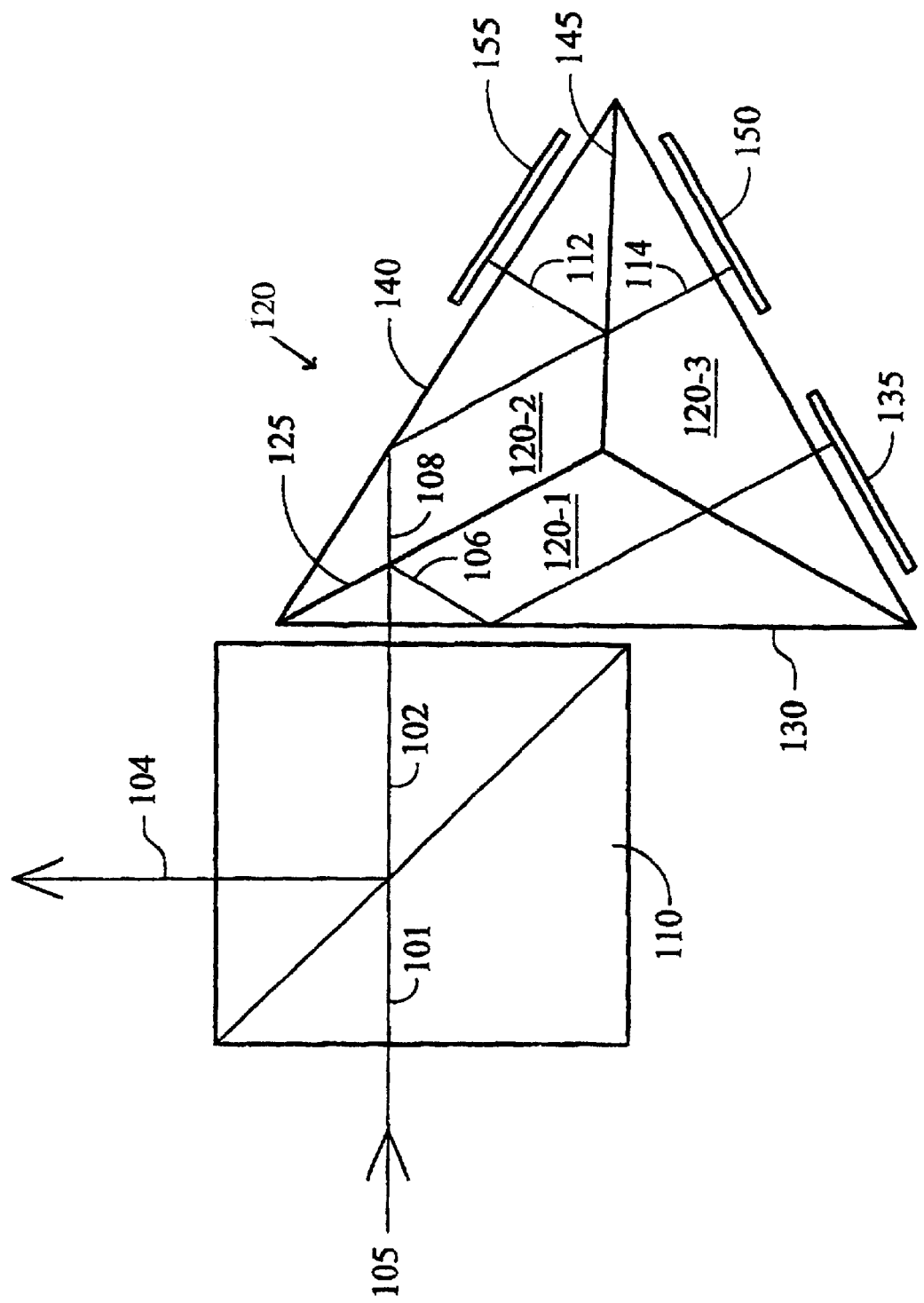
FIG. 2 is a diagram for showing an improved prism assembly configured with three identical prisms of this invention.

Referring to FIG. 2 for a schematic view of a reflective image projection display system implemented with a novel prism assembly of this invention. A white light source 105 projected an non-polarized light 101 to a polarized beam splitter (PBS) 110 for transmitting a P-polarized beam 102 to the prism assembly 120 while the S-polarized beam 104 is reflected away from the prism assembly 120. The prism assembly 120 includes three identical prisms 120-1, 120-2, and 120-3. The three prisms 120-1, 120-2, and 120-3 are seamlessly glue together. Three color-beams are transmitted through and then reflected back from these three prisms with totally equal optical paths. The polarized white light 102 is projected to a first prism 120-1 to a first dichroic surface 125 that reflects a beam 106 of a first color, e.g., a red beam, to a total reflective surface 130 of the first prism 120-1. Meanwhile, the remainder portion of the light 108 passes through the first dichroic surface 125 and projected to a second total reflective surface 140 of the second prism 120-2. The first total reflective surface 130 reflects the red beam to a first liquid crystal on silicon (LCOS) 135. The first LCOS 135 then modulates the red beam and reflects the modulated beam back to combine with other modulated and reflected color beams, e.g., the modulated and reflected green and blue beams as will be further described below to generate a color image. From the second total reflective surface (TIR) 140, the beam 108 is projected to a second dichroic surface 145 where a second color-beam 112, e.g., green (G) is reflected to a second LCOS 155. The second LCOS then modulates and reflects the green beam back to generate a combined modulated color image. From the second dichroic surface 145, a remainder portion 114 of the beam 108, e.g., a blue light, passes through to project to a third LCOS 150. The third LCOS 150 then modulates and reflects back the blue light 114 to combine with the modulated and reflected red and green beams from the first and second LCOS 135 and 155 respectively to generate a combined color image.

For the purpose of providing phase shift compensations, the first TIR surface 130 is coated with first set of multiple layers of thin films to compensate the phase shifts generated from first dichroic reflection from the first dichroic surface 125 for the first color band. Similarly, the second TIR surface 140 is coated with second set of multiple layers of thin films to compensate the phase shifts generated in the optical paths of the second and third color beams in dichroic reflections and transmissions as described above.

Figure 3:
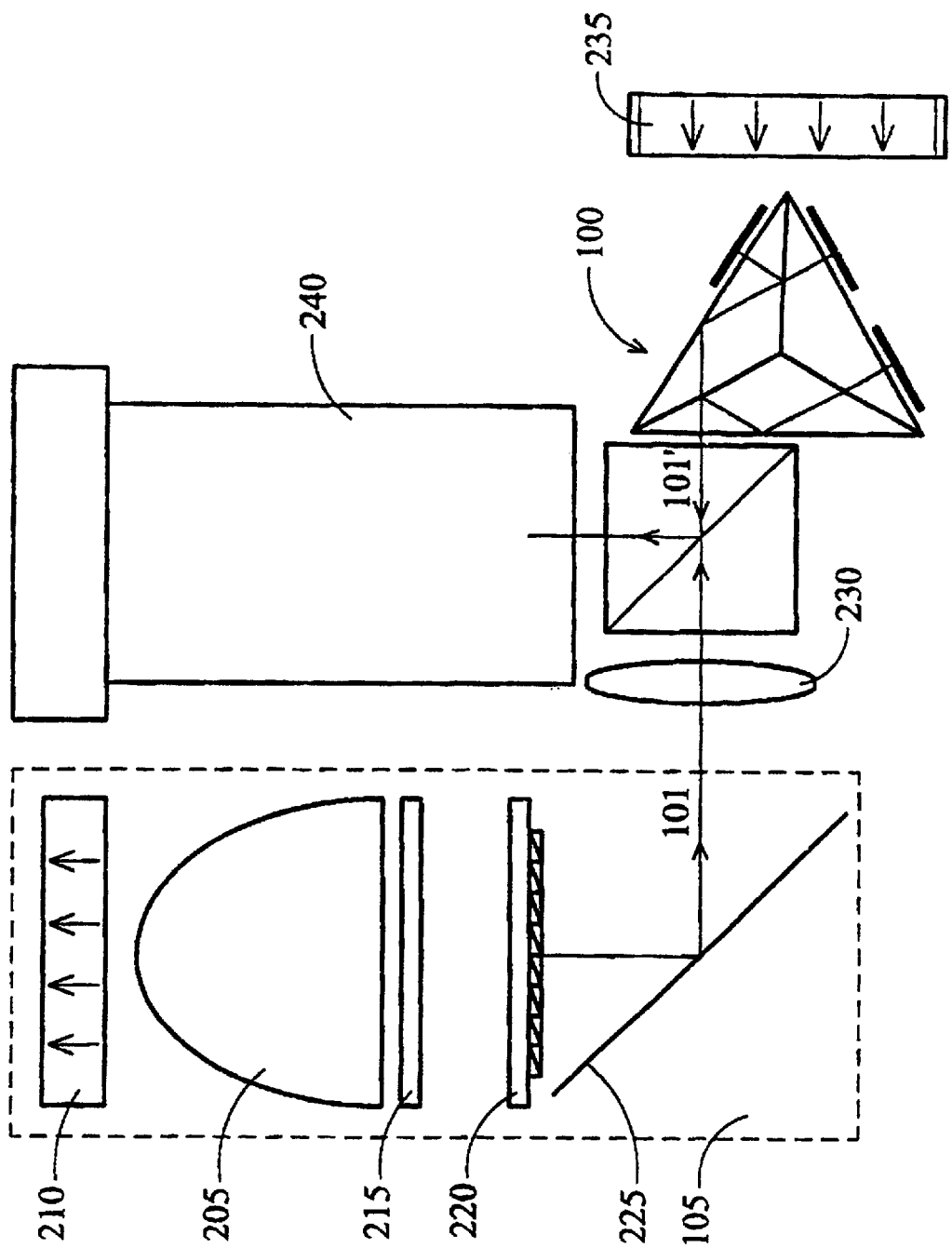
FIG. 3 is a color image projection system implemented with a color separation prism-assembly of FIG. 2.

Referring to FIG. 3 for a color image display system implemented with the prism assembly 100 described above. The color image display system 200 includes a light source assembly 105. The assembly 105 includes a light source 205 cooled by a light source fan 210. The light source 205 projects a light through two lens array 215 and 220 to a reflector 225 for projecting a light 101 through a lens 230 to the PBS 110 and the prism assembly 100. A fan 235 is also employed to cool the prim assembly 100. The PBS 110 as shown reflects the s-polarized beam of the incident beam 101 to the projector 240. The PBS further reflects the modulated and reflected color beams 101' from the prism 100 having a p-polarization state to the projector 240 to project a color image.

A color separation prism assembly is therefore disclosed in this invention. This color separation prism assembly includes three triangular-shaped prisms having an identical shape and size. Each of the three triangular-shaped prisms comprises two triangular surfaces as interfacing surfaces bonded to two identical triangular surfaces of two other prisms. At least two triangular surfaces of the three triangular-shaped prisms are coated with color separation filtering films for reflecting a first color light and transmitting a second color light therethrough. At least two triangular surfaces of the three triangular-shaped prisms are coated with a total reflective coating constituting at least two total internal reflective (TIR) surfaces for reflecting a light projected thereon. Each of the TIR surfaces further comprising a phase-shift compensating coating coated thereon. The color separation assembly further includes three liquid crystal on silicon (LCOS) modulating means for modulating a separated color beam color-separated and projected thereon through the color separation prism assembly. The three triangular-shaped prisms with identical shape and size are further assembled as a combined prism.

This invention discloses a color separation prism assembly comprising three triangular-shaped prisms assembled as a wholly-integrated combined prism. This invention further discloses a color image projection system that includes a color separation prism assembly. The prism assembly includes three triangular-shaped prisms assembled as a wholly-integrated combined prism.

This invention further discloses a method for assembling a color separation prism assembly. The method includes a step of: A) using three triangular-shaped prisms having identical shape and size by coating at least two triangular surfaces of the three triangular-shaped prisms with color separation filtering films for reflecting a first color light and transmitting a second color light therethrough. B) coating at least two triangular surfaces of the three triangular-shaped prisms with a total reflective coating constituting at least two total internal reflective (TIR) surfaces for reflecting a light projected thereon and for compensating a phase-shift of a color light reflected from the TIR surfaces. And, C) using two triangular surfaces as interfacing surfaces for bonding to two identical triangular surfaces of two other prisms for assembling the three triangular-shaped prisms having identical shape and size into a wholly integrated combined prism.

The prism assembly 100 as shown has several advantages. Compared to the conventional Philip prisms and the prisms disclosed by prior art patents, the prism assembly is more compact and has a reduced mass and weight. The tooling cost is lowered since identical triangular prisms are used to form the assembly. The processes for depositing multiple layers of thin films for dichroic filtering and phase shift compensation are also simplified and can be more conveniently mass produced. The configuration of the prism assembly further enhance the heat dissipation process because the assembly can be cooled with a single fan instead of multiple fans as that usually required by conventional assembly configuration. The prism assembly as a single unit is more compact and more convenient to handle and process for implementation as a color separation prism assembly in a color image display system.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A color separation prism assembly comprising:
   three triangular-shaped prisms having identical shape and size wherein each of said three triangular-shaped prisms comprising two triangular surfaces as interfacing surfaces bonded to two identical triangular surfaces of two other prisms.

2. The color separation prism assembly of claim 1 wherein:
   at least two triangular surfaces of said three triangular-shaped prisms are coated with color separation filtering films for reflecting a first color light and transmitting a second color light therethrough.

3. The color separation prism assembly of claim 1 wherein:
   at least two triangular surfaces of said three triangular-shaped prisms are coated with a total reflective coating constituting at least two total internal reflective (TIR) surfaces for reflecting a light projected thereon.

4. The color separation prism assembly of claim 3 wherein:
   each of said TIR surfaces further comprising a phase-shift compensating coating coated thereon.

5. The color separation prism-assembly of claim 1 further comprising:
   three liquid crystal on silicon (LCOS) modulating means disposed around said prism assembly for receiving and modulating a separated color beam projected thereon from said prism assembly.

6. The color separation prism assembly of claim 1 wherein:
   said three triangular-shaped prisms with identical shape and size are further assembled as a wholly-integrated combined prism.

7. A method for assembling a color separation prism comprising:
   assembling said color separation prism using three triangular-shaped prisms by using two triangular surfaces as interfacing surfaces for bonding to two identical triangular surfaces of two other prisms.

8. The method of claim 7 wherein:
   said step of using said three triangular-shaped prisms further comprising a step of coating at least two triangular surfaces of said three triangular-shaped prisms with color separation filtering films for reflecting a first color light and transmitting a second color light therethrough.

9. The method of claim 7 wherein:
   said step of using said three triangular-shaped prisms further comprising a step of coating at least two triangular surfaces of said three triangular-shaped prisms with a total reflective coating constituting at least two total internal reflective (TIR) surfaces for reflecting a light projected thereon.

10. The method of claim 9 wherein:

said step of coating at least two triangular surfaces of said three triangular-shaped prisms with a total reflective further comprising a step of coating each of said TIR surfaces with a phase-shift compensating coating.

11. The method of claim 7 further comprising a step of:

projecting three color-separated beams through said color separation prism assembly onto three corresponding liquid crystal on silicon (LCOS) modulating means and modulating each of said separated color beams by using said three corresponding liquid crystal on silicon (LCOS) modulating means.

12. The method of claim 7 wherein:

said step of assembling said color separation prism using three triangular-shaped prisms further comprising a step of assembling said three triangular-shaped prisms into an wholly-integrated combined prism.

13. A color separation prism assembly comprising:

three triangular-shaped prisms having identical shape and size;

each of said three triangular-shaped prisms comprising two triangular surfaces as interfacing surfaces bonded to two identical triangular surfaces of two other prisms;

at least two triangular surfaces of said three triangular-shaped prisms are coated with color separation filtering films for reflecting a first color light and transmitting a second color light therethrough;

at least two triangular surfaces of said three triangular-shaped prisms are coated with a total reflective coating constituting at least two total internal reflective (TIR) surfaces for reflecting a light projected thereon, and each of said TIR surfaces further comprising a phase-shift compensating coating coated thereon; and said three triangular-shaped prisms with identical shape and size are further assembled as a wholly-integrated combined prism.

14. The color separation prism-assembly of claim 13 further comprising:

three liquid crystal on silicon (LCOS) modulating means disposed around said prism assembly for receiving and modulating a separated color beam projected thereon from said prism assembly.

15. A method for assembling a color separation prism assembly comprising:

using three triangular-shaped prisms having identical shape and size by coating at least two triangular surfaces of said three triangular-shaped prisms with color separation filtering films for reflecting a first color light and transmitting a second color light therethrough;

coating at least two triangular surfaces of said three triangular-shaped prisms with a total reflective coating constituting at least two total internal reflective (TIR) surfaces for reflecting a light projected thereon and for compensating a phase-shift of a color light reflected from said TIR surfaces;

using two triangular surfaces as interfacing surfaces for bonding to two identical triangular surfaces of two other prisms for assembling said three triangular-shaped prisms having identical shape and size into a wholly integrated combined prism.

16. The method of claim 15 further comprising a step of:

projecting three color-separated beams through said color separation prism assembly onto three corresponding liquid crystal on silicon (LCOS) modulating means and modulating each of said separated color beams by using said three corresponding liquid crystal on silicon (LCOS) modulating means.

* * * * *